(12) United States Patent
Stephenson

(10) Patent No.: US 6,353,895 B1
(45) Date of Patent: Mar. 5, 2002

(54) RAID ARCHITECTURE WITH TWO-DRIVE FAULT TOLERANCE

(75) Inventor: Dale J. Stephenson, Tracy, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/250,657

(22) Filed: Feb. 16, 1999

Related U.S. Application Data

(60) Provisional application No. 60/075,273, filed on Feb. 19, 1998.

(51) Int. Cl.[7] .......................... G06F 11/00; G06F 17/30; G11B 5/00
(52) U.S. Cl. ................................ 714/5; 714/6; 711/114
(58) Field of Search ................................ 714/6, 7, 767, 714/770, 800, 5; 711/114, 100, 111; 707/202; 709/214

(56) References Cited

U.S. PATENT DOCUMENTS

| | | | |
|---|---|---|---|
| 5,446,855 A | * | 8/1995 | Dang et al. |
| 5,774,641 A | * | 6/1998 | Islam et al. |
| 6,138,125 A | * | 10/2000 | DeMoss |
| 6,219,800 B1 | * | 4/2001 | Johnson et al. |
| 6,223,323 B1 | * | 4/2001 | Wescott |

OTHER PUBLICATIONS

M. Blaum, J. Brady, J. Bruck, and J. Menoa, "EVENODD: An Efficient Scheme for Tolerating Double Disk Failures in RAID Architectures, " 4–94, IEEE Transaction on Computers, vol. 44, No. 2.

* cited by examiner

*Primary Examiner*—Gopal C. Ray
(74) *Attorney, Agent, or Firm*—Martine & Penilla, LLP

(57) ABSTRACT

A two-dimensional parity arrangement that provides two-drive fault tolerance in a RAID system is presented. The parity arrangement uses simple exclusive-or (XOR) parity codes rather than the more complex Reed-Solomon codes used in a conventional RAID 6 implementation. User data on the physical disk drives in the RAID system is arranged into XOR row parity sets and XOR column parity sets. The XOR parity sets are distributed across the physical disk drives by arranging the parity sets such that the data on each physical drive exists in two separate parity sets, with no stripe unit in the same two sets. The storage lost due to parity is equal to the capacity of two drives, or 2/N the total capacity of an N-drive array. Accordingly, this parity arrangement uses less storage than mirroring when the number of total drives is greater than four.

11 Claims, 6 Drawing Sheets

RAID ARCHITECTURE WITH TWO-DRIVE FAULT TOLERANCE

CROSS REFERENCE TO RELATED APPLICATIONS

The present application claims priority benefit of U.S. Provisional Application No. 60/075,273, filed Feb. 19, 1998.

BACKGROUND OF THE INVENTION

1. Field of the Invention

The disclosed invention relates to architectures for arrays of disk drives, and more particularly, to disk array architectures that provide two-drive fault tolerance.

2. Description of the Related Art

A Redundant Array of Independent Disks (RAID) is a storage technology wherein a collection of multiple disk drives is organized into a disk array managed by a common array controller. The array controller presents the array to the user as one or more virtual disks. Disk arrays are the framework to which RAID functionality is added in functional levels to produce cost-effective, highly available, high-performance disk systems.

RAID level 0 is a performance-oriented striped data mapping technique. Uniformly sized blocks of storage are assigned in a regular sequence to all of the disks in the array. RAID 0 provides high I/O performance at low cost. Reliability of a RAID 0 system is less than that of a single disk drive because failure of any one of the drives in the array can result in a loss of data.

RAID level 1, also called mirroring, provides simplicity and a high level of data availability. A mirrored array includes two or more disks wherein each disk contains an identical image of the data. A RAID level 1 array may use parallel access for high data transfer rates when reading. RAID 1 provides good data reliability and improves performance for read-intensive applications, but at a relatively high cost.

RAID level 2 is a parallel mapping and protection technique that employs error correction codes (ECC) as a correction scheme, but is considered unnecessary because off-the-shelf drives come with ECC data protection. For this reason, RAID 2 has no current practical use, and the same performance can be achieved by RAID 3 at a lower cost. As a result, RAID 2 is rarely used.

RAID level 3 adds redundant information in the form of parity data to a parallel accessed striped array, permitting regeneration and rebuilding of lost data in the event of a single-disk failure. One stripe unit of parity protects corresponding stripe units of data on the remaining disks. RAID 3 provides high data transfer rates and high data availability. Moreover, the cost of RAID 3 is lower than the cost of mirroring since there is less redundancy in the stored data.

RAID level 4 uses parity concentrated on a single disk to allow error correction in the event of a single drive failure (as in RAID 3). Unlike RAID 3, however, member disks in a RAID 4 array are independently accessible. Thus RAID 4 is more suited to transaction processing environments involving short file transfers. RAID 4 and RAID 3 both have a write bottleneck associated with the parity disk, because every write operation modifies the parity disk.

In RAID 5, parity data is distributed across some or all of the member disks in the array. Thus, the RAID 5 architecture achieves performance by striping data blocks among N disks, and achieves fault-tolerance by using 1/N of its storage for parity blocks, calculated by taking the exclusive-or (XOR) results of all data blocks in the parity disks row. The write bottleneck is reduced because parity write operations are distributed across multiple disks.

The RAID 6 architecture is similar to RAID 5, but RAID 6 can overcome the failure of any two disks by using an additional parity block for each row (for a storage loss of 2/N). The first parity block (P) is calculated with XOR of the data blocks. The second parity block (Q) employs Reed-Solomon codes.

RAID 6 provides for recovery from a two-drive failure, but at a penalty in cost and complexity of the array controller because the Reed-Solomon codes are complex and may require significant computational resources. The complexity of Reed-Solomon codes may preclude the use of such codes in software and may necessitate the use of expensive special purpose hardware. Thus, implementation of Reed-Solomon codes in a disk array increases the cost and complexity of the array. Unlike the simpler XOR codes, Reed-Solomon codes cannot easily be distributed among dedicated XOR processors.

SUMMARY OF THE INVENTION

The present invention solves these and other problems by providing two-drive fault tolerance using simple XOR codes (rather than Reed-Solomon codes). The XOR parity stripe units are distributed across the member disks in the array by separating parity stripe units from data stripe units. In one embodiment, the number of data stripe units is the same as the square of two less than the number of drives (i.e., (N−2 * N−2)). Each data stripe unit is a member of two separate parity sets, with no two data stripe units sharing the same two parity sets. Advantageously, the storage loss to parity stripe units is equal to the sum of the dimensions, so this parity arrangement uses less storage than mirroring when the number of total drives is greater than four.

One embodiment includes a redundant array of independent disk drives that provides one-drive and two-drive fault tolerance. The array includes two or more disk drives and a disk controller. Data recovery from a one or two drive failure is accomplished by using a two-dimensional XOR parity arrangement. The controller is configured to calculate row XOR parity sets and column XOR parity sets, and to distribute the parity sets across the disks drives in the array. The parity sets are arranged in the array such that no data block on any of the disk drives exists in two row parity sets or two column parity sets. In one embodiment, the controller is configured to reduce reconstruction interdependencies between disk blocks.

BRIEF DESCRIPTION OF THE DRAWINGS

The advantages and features of the disclosed invention will readily be appreciated by persons skilled in the art from the following detailed description when read in conjunction with the drawings listed below.

Figure 1:
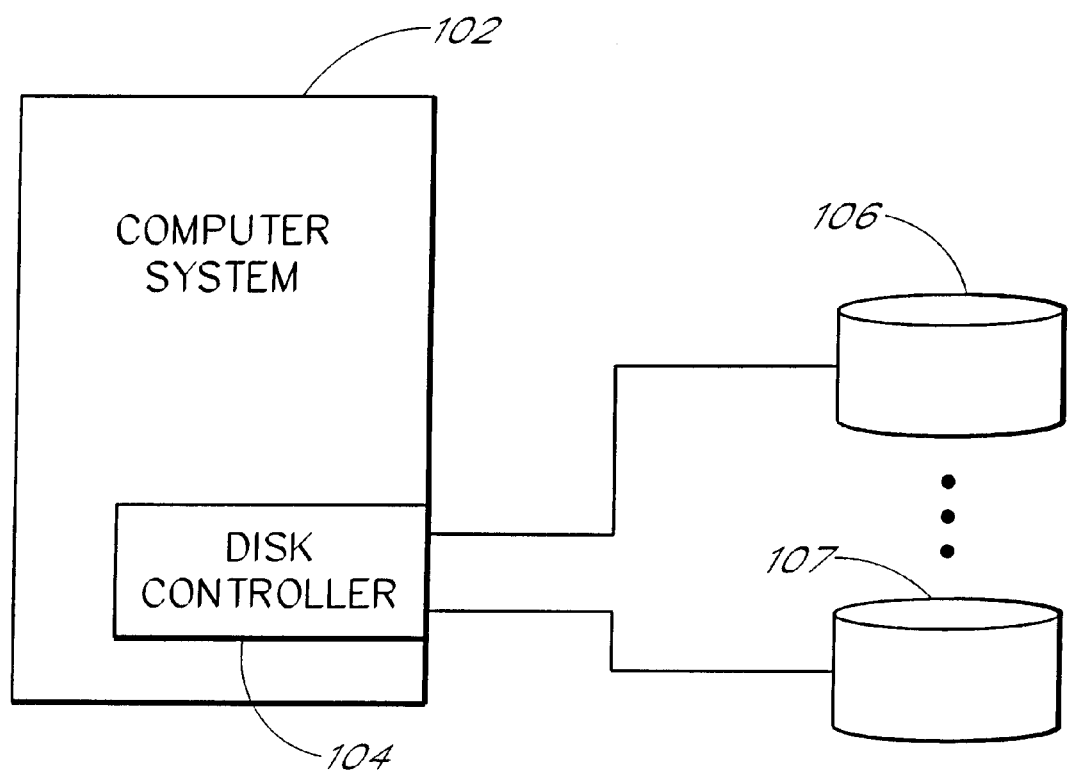
FIG. 1 is a hardware block diagram showing attachment of one or more disk drives to a computer system.

In the drawings, the first digit of any three-digit number generally indicates the number of the figure in which the element first appears. Where four-digit reference numbers are used, the first two digits indicate the figure number.

DETAILED DESCRIPTION OF THE PREFERRED EMBODIMENT

FIG. 1 is a hardware block diagram showing attachment of one or more disk drives to a computer system. In FIG. 1, a disk controller 104 is attached to a computer system 102. One or more disk drives 106–107 are provided to the controller 104. Typically, the disk controller communicates with a low level software program, known as a device driver, running on the computer system 102. The device driver controls the operation of the disk controller 104 and directs the controller 104 to read and write data on the disks 106–107. As is well known, there may be more than one disk controller 104 that may either be external to or part of the computer system 102.

Figure 2:
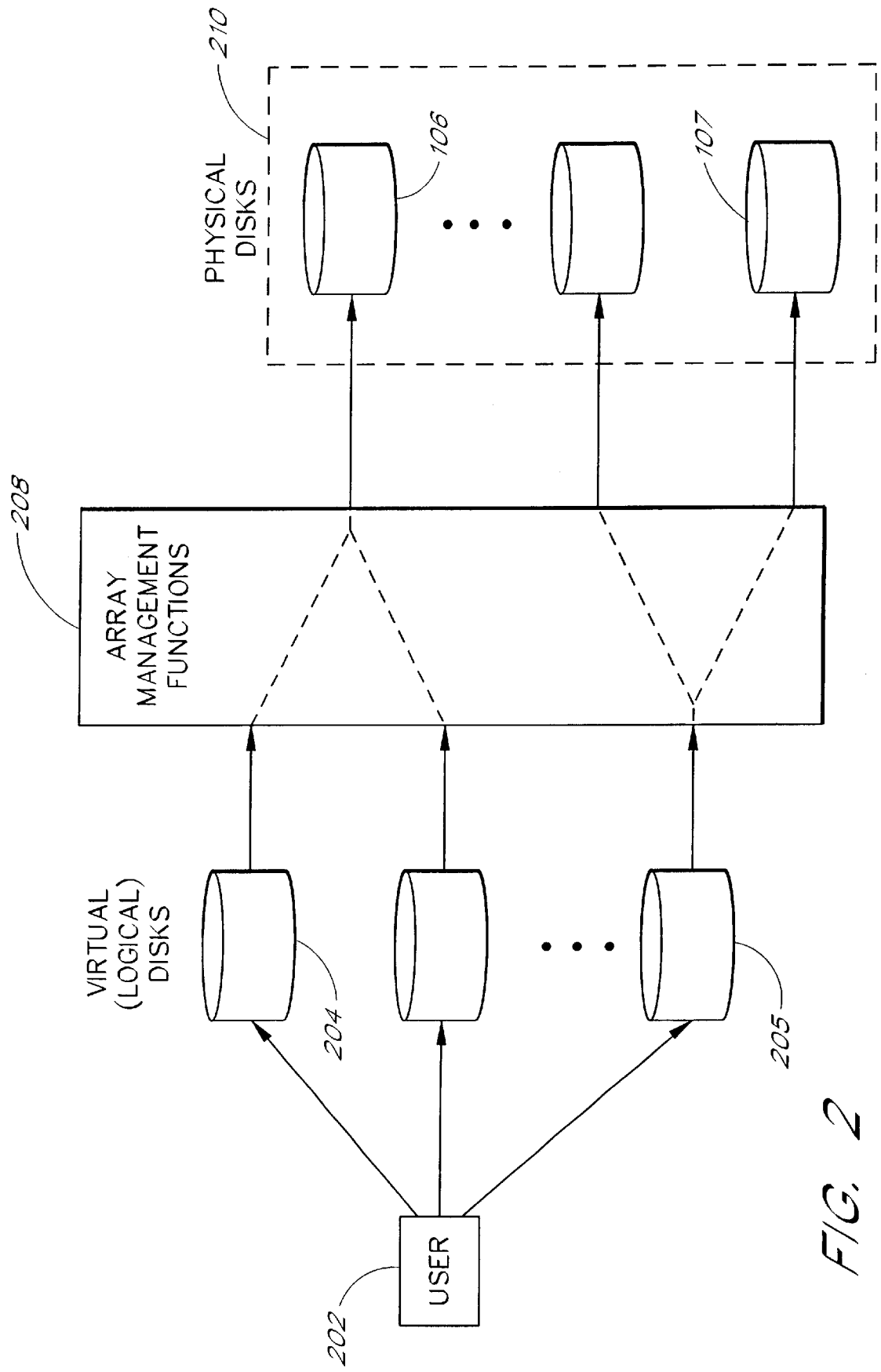
FIG. 2 is a logical block diagram of a disk array system showing mapping of one or more physical disk drives to one or more logical drives.

FIG. 2 is a logical block diagram of a disk array system showing mapping of the disk drives 106–107 in an array 210 into one or more logical disk drives 204–205. The mapping of the physical drives 106–107 to the logical drives 209 is provide by an array controller 208 which may be implemented in hardware, software, or both.

The array controller 208 maps the physical drives 106–107 into logical disks 204–205 such that a computer user 202 only "sees" the logical disks 204–205 rather than the physical drives 106–107. The number of physical drives 106–107, and the size of the physical drives 106–107 may be changed without affecting the number and size of the logical drives 204–205. Several physical drives 106–107 may be mapped into a single logical drive. Conversely, one of the physical drives 106–107 may be mapped into several logical drives. In addition to mapping physical drives 106–107 to logical drives 204–205, the array controller provides data striping of the data on the physical drives 106–107, and the array controller 208 corrects errors due to the failure of one or more of the physical drives 106–107.

The array controller 208 maps data address on the physical drives 106–107 into logical address in the logical disks 204–205. Logical addresses are typically described in terms of logical blocks, numbered consecutively from 0 to N. Typically, the user 202 does not know how logical addresses map to physical addresses. Thus, for example, if the user 202 writes data to logical block 3, the user will not know which of the physical disks 106–107 actually receives the data. In order to balance I/O loads across the drives, the array controller will often map consecutive logical blocks across several physical drives, as shown in FIG. 3.

Figure 3:
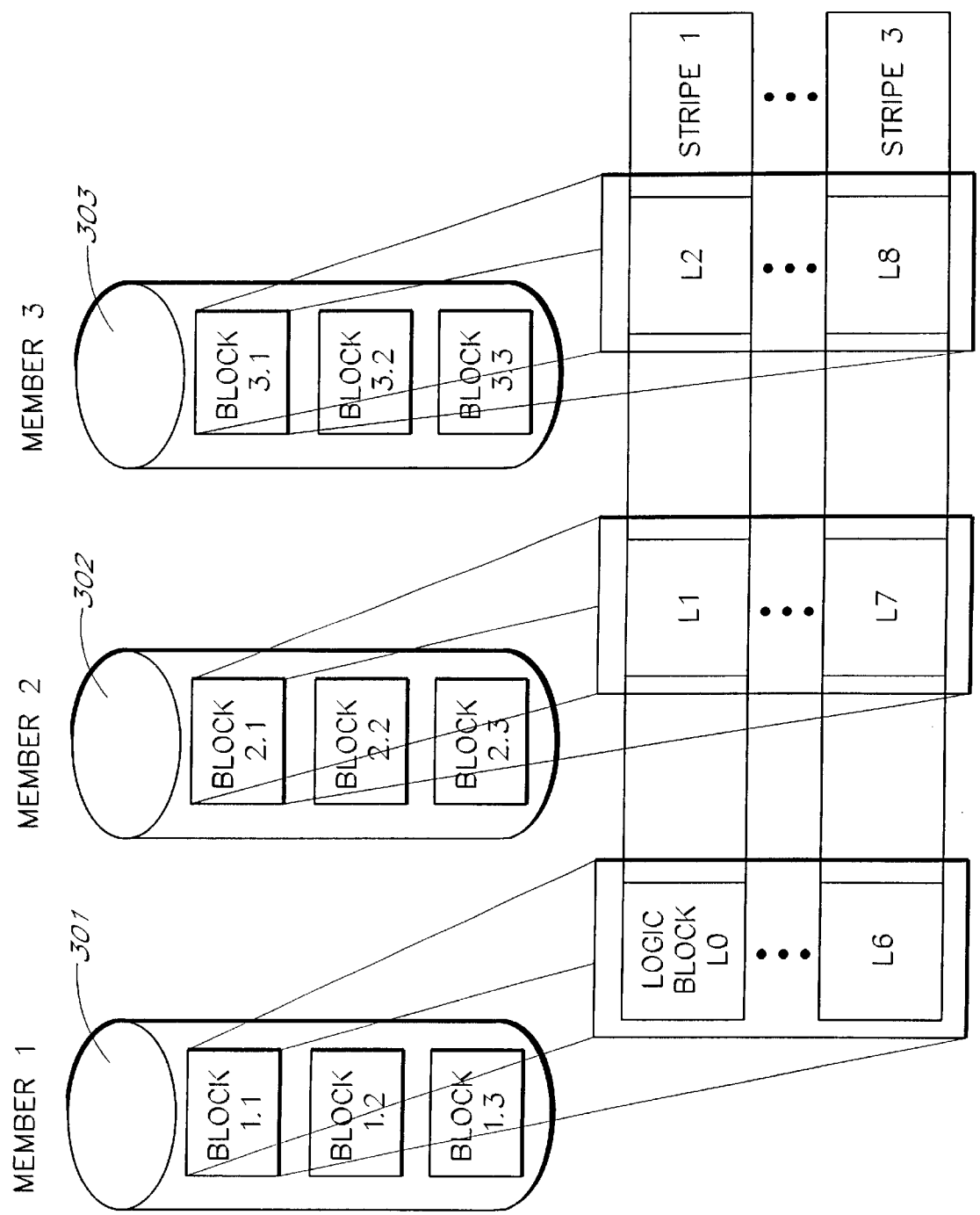
FIG. 3 is a logical block diagram showing data striping, wherein each logic block is equivalent to a stripe unit.

FIG. 3 shows an address mapping scheme known as disk striping, wherein physical address blocks having the same physical address but residing, on different physical disk drives are mapped into units known as stripes. For convenience, the present disclosure treats each stripe unit as having only one block, with the understanding that a stripe may contain multiple blocks. FIG. 3 shows three member drives 301–303 in a disk array. Each member drive has three physical disk blocks (a typical real-world disk drive would have tens of thousands of blocks). The physical blocks on member disk one 301 are labeled 1.1, 1.2, and 1.3. The physical blocks on member disk two 302 are labeled 2.1, 2.2, and 2.3. The physical blocks on member disk three 301 are labeled 3.1, 3.2, and 3.3. A first stripe, stripe 1, includes physical blocks 1.1, 2.1, and 3.1. A third stripe, stripe 3, comprises physical blocks 1.3, 2.3, and 3.3. Logical blocks 0–2 are mapped into stripe 1 and logical blocks 6–8 are mapped into stripe 3.

In many cases a user accessing data from the logical disks w ill access the logical disk blocks consecutively. The stripe mapping shown in FIG. 3 maps consecutive logical blocks across different disk drives. Thus a user accessing logical blocks in a consecutive fashion will see improved I/O performance because the disk operations will tend to be more uniformly distributed across all of the available disk drives.

The extent to which the array controller 208 can correct for multiple drive failures depends, in part, on the redundancy and/or parity (i.e., error correction) data stored on the physical drives 106–107. In a single dimension parity system such as RAID 3 and RAID 4, the array controller 208 can correct errors due to failure of one of the physical disks 106–107.

The present invention provides a parity arrangement whereby the array controller 208 can correct for failure of any two of the physical drives 106–107. Two-drive fault tolerance is provided using simple exclusive-or (XOR) parity processing and also using 2/N of the physical drive space for parity encoding. The two-drive XOR parity arrangement can be described in terms of four criteria as follows. First, each stripe unit in the physical drives is a member of two different parity sets. Second, different stripe units have do not have common membership in both parity sets with another stripe unit. Third, members of a parity set (including the parity unit) are spread across different physical drives. Fourth, data is available after failure of any two of the physical drives 106–107.

Parity data is provided in an N-by-N parity map within the array 210, where N is the number of physical drives, and the storage capacity is equal to N-2 drives. One parity set includes the stripe units on a given row (row parity), while its complementary parity set is a column (column parity) drawn from N-2 different rows (and also N-2 different drives). The stripe units are also distributed in such a manner that they can be striped. An example for a our drive array having four stripes per drive (four-by-four) is shown in Table 1. The data on each of the four drives is shown in columns one through four. The data in each of the four stripes is shown in rows one through four. The four-by-four arrangement result in sixteen blocks, as shown. There are eight blocks of actual user data, and eight parity blocks. Each data block has a physical location (i.e., its physical location on a disk drive) and a logical position (its position in the two-dimensional parity arrangement). Each data block is a member of two parity sets, a row parity set and a column parity set. Letters are used to denote the row parity for a data block and numbers are used to denote column parity for a data block. Parity blocks contain no user information, but rather, only parity information. Each parity block is a member of only one parity set, either a row parity set or a column parity set. In Table 1, parity blocks are shown in parentheses.

For example, in Table 1, the block A2 is a data block containing user data. Physically, the block A2 resides in the first stripe unit on the second drive. Logically, the block A2 is a member of the row parity set A, and is also a member of the column parity set 2.

TABLE 1

|  | Drive 1 | Drive 2 | Drive 3 | Drive 4 |
|---|---|---|---|---|
| Stripe 1 | A3 | A2 | (1) | (A) |
| Stripe 2 | (2) | (B) | B4 | B1 |
| Stripe 2 | C1 | C4 | (3) | (C) |
| Stripe 4 | (4) | (D) | D2 | D3 |

The arrangement shown in Table 1 visually fits the first three criteria. First, each stripe unit (user data block) is a member of two different parity sets. Second, different stripe units do not have common membership in both parity sets with another stripe unit. Thus, for example, there is only one block A2. Third, members of a parity set (including the parity unit) are spread across different physical drives. For example, the column parity set 1 is spread across drives 1, 3, and 4, the row parity set A is spread across drives 1, 2, and 4.

With regards to the fourth criteria, for this simple arrangement, there are 48 different stripe-unit/drive combinations to consider (eight different stripe units, six possible two-drive failure combinations). Forty of these can be handled by using surviving members, while eight have dependencies that require the reconstruction of another stripe unit.

Within an XOR parity set (either row or column) the value of any block in the set is computed as simply the XOR (denoted by the symbol "$\oplus$") of all of the other blocks in the set. Thus, for example, Table 1 shows a row parity set "A" having members (A), A2 and A3. (Note that the block A2 is also a member of the column parity set "2", and the block A3 is also a member of the column parity set "3"). The blocks A2 and A3 contain actual user data. The block (A) is the parity block. Thus, the following relationships are all valid:

(A)=A2$\oplus$A3
A2=(A)$\oplus$A3
A3=(A)$\oplus$A2

When the user writes data to a disk block, the parity blocks corresponding to that disk block are recomputed. Thus, for example, if the user writes new data to the block A2, then the value of the row parity block (A) is recomputed as (A)=A2$\oplus$A3 and stored, and the value of the column parity block (2) is recomputed as (2)=A2$\oplus$D2 and stored.

With the values of (A) and (2) computed and saved as above, then the value of A2 can be reconstructed if needed. If drive 2 (the drive containing A2) should fail, the value of A2 can be reconstructed from either of the following relationships:

A2=(A)$\oplus$A3
A2=(2)$\oplus$D2

If, however, the first two drives (drives 1 and 2) in Table 1 fail, then both (2) and A3 are unavailable, since (2) is stored on drive 1 and A3 is stored on drive 2. As shown in the above equations, at least one of the value (2) or A3 is needed to reconstruct A2. Fortunately, A3 can be reconstructed from A3=(3) $\oplus$D3, because (3) is stored on drive 3 and D3 is on drive 4. Thus, A2 is dependent on A3 to survive this particular two-drive failure. If both drive 1 and drive 2 fail, A2 can be reconstructed by calculating A3=(3)$\oplus$D3 followed by A2=(A)$\oplus$A3.

All of the dependencies in the four drive arrangement shown in Table 1 can be resolved. Thus, the failure of any two drives in Table 1 will not result in the loss of data because the data in all of the blocks on the failed disks can be reconstructed.

Table 2 shows a five drive arrangement wherein all dependencies can be resolved.

TABLE 2

| A2 | A1 | A5 | (1) | (A) |
|---|---|---|---|---|
| B1 | (2) | (B) | B3 | B2 |
| (C) | C4 | C3 | C2 | (3) |
| D4 | D3 | (4) | (D) | D5 |
| (5) | (E) | E1 | E5 | E4 |

With larger sets, involving more than four drives, it is possible to construct parity arrangements that satisfy the first three criteria, but that have circular (unresolvable) dependencies. A parity arrangement with circular dependencies will have some data blocks that cannot be reconstructed after a two-drive failure. Consider, for example, the six drive arrangement shown in Table 3.

TABLE 3

| drive | | | | | |
|---|---|---|---|---|---|
| 1 | 2 | 3 | 4 | 5 | 6 |
| A2 | A3 | A4 | A5 | (1) | (A) |
| B5 | B4 | (2) | (B) | B3 | BI |
| (3) | (C) | C1 | C2 | C6 | C5 |
| D1 | D2 | D6 | D3 | (4) | (D) |
| E4 | E6 | (5) | (E) | E2 | E3 |
| (6) | (F) | F3 | F1 | F5 | F4 |

If the 4th and 6th drives failed, stripe units (blocks) D3 and E3 would be unrecoverable. Neither D3 nor E3 can be reconstructed by use of the row parity groups, since row parity units (D) and (E) are on the failed drives. So D3 and E3 both would need to be reconstructed by use of the column parity set (3). Recall that any one member of a parity set can be reconstructed from the other members of the set. If two members of a parity set are missing, then the set cannot be reconstructed. Both D3 and E3 are members of the same column parity set, set (3). Thus reconstruction of D3 from the column parity set (3) requires that E3 be reconstructed first (and vice versa). Thus, D3 and E3 cannot be reconstructed.

Constructing the Parity Arrangement

As shown in Table 3 above, there are many possible arrangements (schemes) of data and parity blocks. Although it is possible to construct parity sets that have circular dependencies, it is also possible to construct parity sets that have no circular dependencies. Clearly, the most desirable arrangements are arrangements that have no circular dependencies.

Even when an arrangement has no circular dependencies, there may be interdependencies (as in the case above where in a two-drive failure, A2 was dependent on A3). Interdependencies create additional overhead when a block must be reconstructed. Thus, the most efficient parity arrangements are those arrangements that provide the lowest reconstruction overhead (i.e., the arrangements that have the fewest interdependencies).

Figure 4:
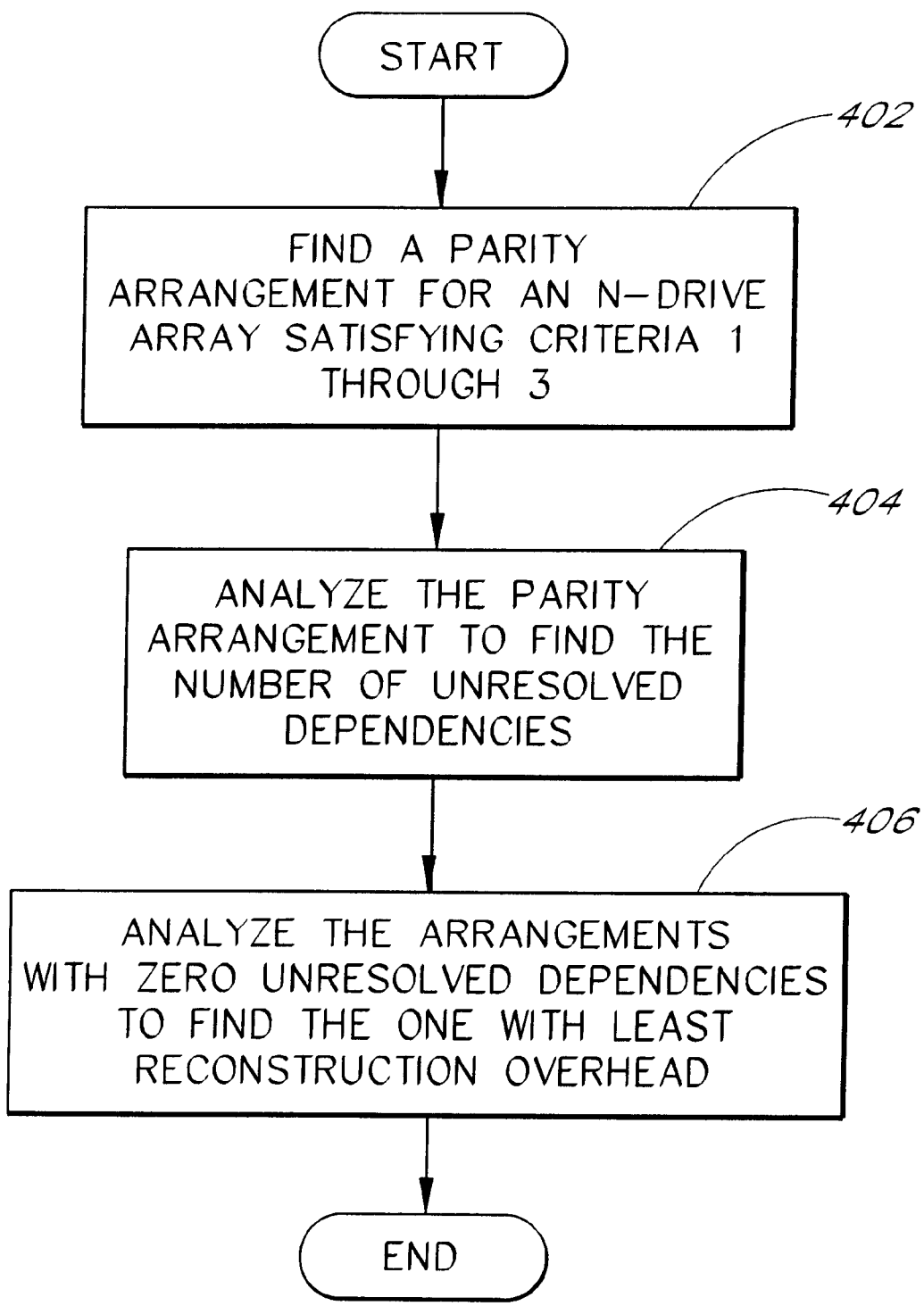
FIG. 4 is a flowchart showing an overview of the design process.

FIG. 4 is an overview flowchart of the identification process. The process shown in FIG. 4 begins at a find process block 402, which includes finding a parity arrangement for an N-drive array satisfying the first three criteria above. The process then advances to a first analysis block 404 where the parity arrangement is analyzed to find the number of unresolved dependencies. The process then advances to a second analysis block 406 where the arrangements zero unresolved dependencies (found in process block 404) are analyzed to find a parity arrangement with the lowest reconstruction overhead.

In the find process block 402, the process declares an integer matrix with size N×N. It is assumed that the stripe units should be striped, and also that each row will contain both a row parity unit and a column parity unit. Furthermore, it is assumed that all stripe units in a given row will comprise the parity set for that row. So the process begins by initializing the matrix according to the following pattern (example is a 6×6 array) as shown in Table 4.

TABLE 4

| 0 | 0 | 0 | 0 | R | C |
|---|---|---|---|---|---|
| 0 | 0 | R | C | 0 | 0 |
| R | C | 0 | 0 | 0 | 0 |
| 0 | 0 | 0 | 0 | R | C |
| 0 | 0 | R | C | 0 | 0 |
| R | C | 0 | 0 | 0 | 0 |

In Table 4, a value of 0 is a stripe unit not yet assigned to a column set, R represents the row parity unit, and C represents a column parity set unit (internally, R and C are set to 0x80 and 0x40 respectively). Each C is associated with a parity set equal to its row, the C in the first row belongs to set 1, the C in the second row belongs to set 2, etc. If the rows were counted from 0, the unassigned blocks would be set to −1 for this algorithm.

In this example, the row parity always precedes the column parity. An optional definition allows the order of R and C to alternate within a parity arrangement. If an R and C can share the same column (always the case with an odd number of drives), the sets they are produced from can have no stripe units in common (the program maintains a list of bad row/column combinations to make sure the rule is not violated).

Figure 5:
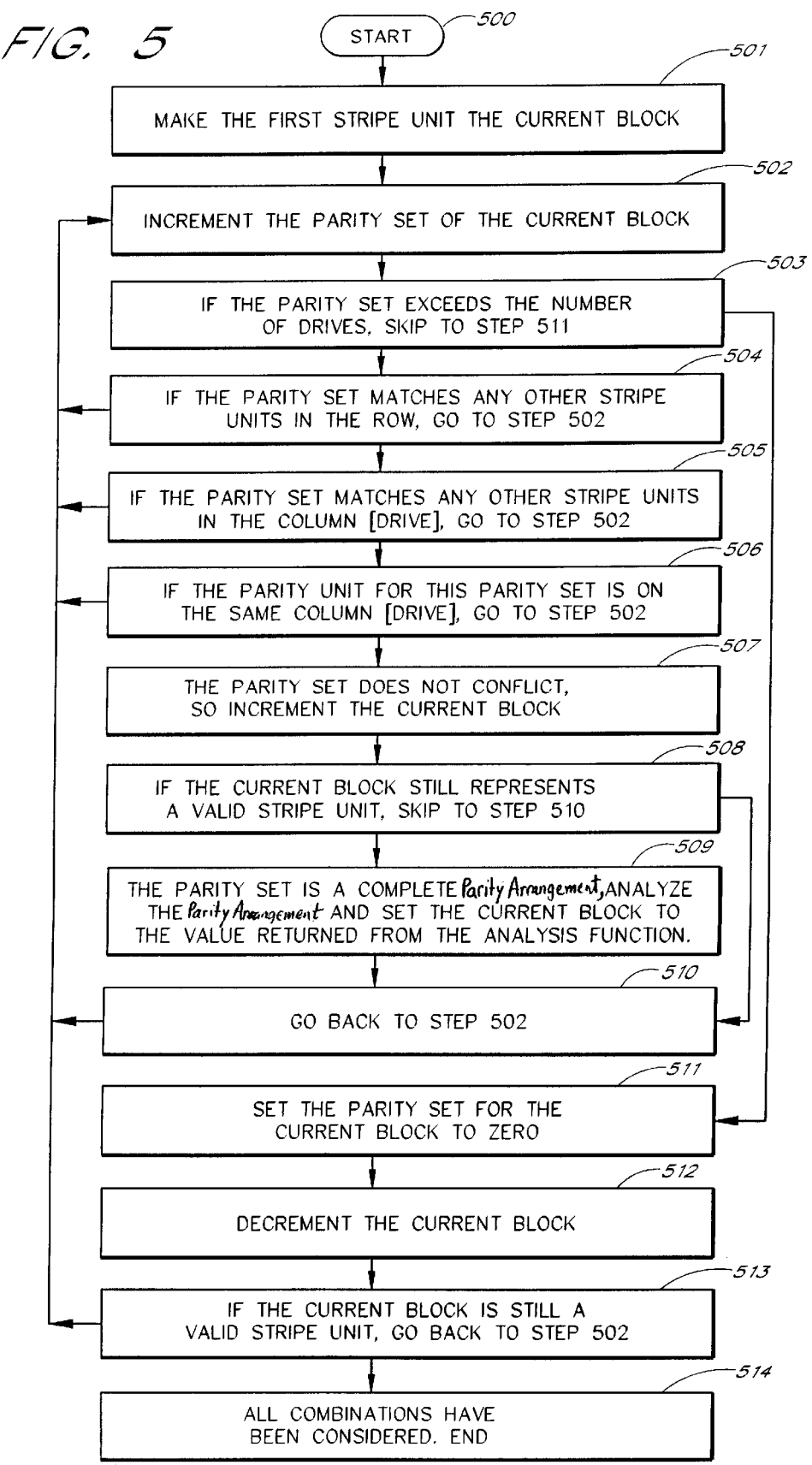
FIG. 5 is a flowchart showing the processes steps of finding a column parity set.

The program then proceeds through the array according to the flowchart shown in FIG. 5, beginning at a process block 501. In the process block 501 the process sets the first stripe unit as the current block and then advances to a process block 502. In the process block 502, the process increments the parity set of the current block and advances to a process block 503. In the process block 503, if the parity set exceeds the number of drives, then the process jumps forward to a process block 511; otherwise, the process advances to a process block 504. In the process block 504, if the parity set matches any other stripe units in the row, then the process returns to the process block 502, otherwise, the process advances to a process block 505.

In the process block 505, if the parity set matches any other stripe units in the column (drive), then the process returns to the process block 502, otherwise, the process advances to a process block 506. In the process block 506, if the parity unit for this parity set is on the same column (drive), then the process returns to the process block 502; otherwise, the process advances to a process block 507. In the process block 507, it is assumed that the parity set does not conflict, and the current block is incremented and the process advances to a process block 508. In the process block 508, if the current block still represents a valid stripe unit, then the process jumps to a process block 510; otherwise, the process advances to a process block 509.

Upon reaching the process block 509, the process has identified a complete parity arrangement. In the process block 509, the process performs the analysis shown in connection with FIG. 6 and sets the current block to the value returned from the analysis function. The process then advances to the process block 510. In the process block 510, the process jumps back to the process block 502.

In the process block 511, the process sets the parity set for the current block to zero and advances to a process block 512. In the process block 512, the process decrements the current block and advances to a process block 513. In the process block 513, if the current block is still a valid stripe unit, then the process jumps back to the process block 502; otherwise, the process advances to a process block 514. When the process reaches the process block 514, all of the possible combinations have been considered, and the process exits.

An optional define can be used to insert a step 4a—If the parity block for this parity set is in this row, go to step 2. This is not a logical requirement, but can reduce the number of combinations considered. Another optional define can be used to fill a number of blocks (generally the stripe units in the first row) with assigned parity sets, and terminating the program when it makes its way back to that level.

Figure 6:
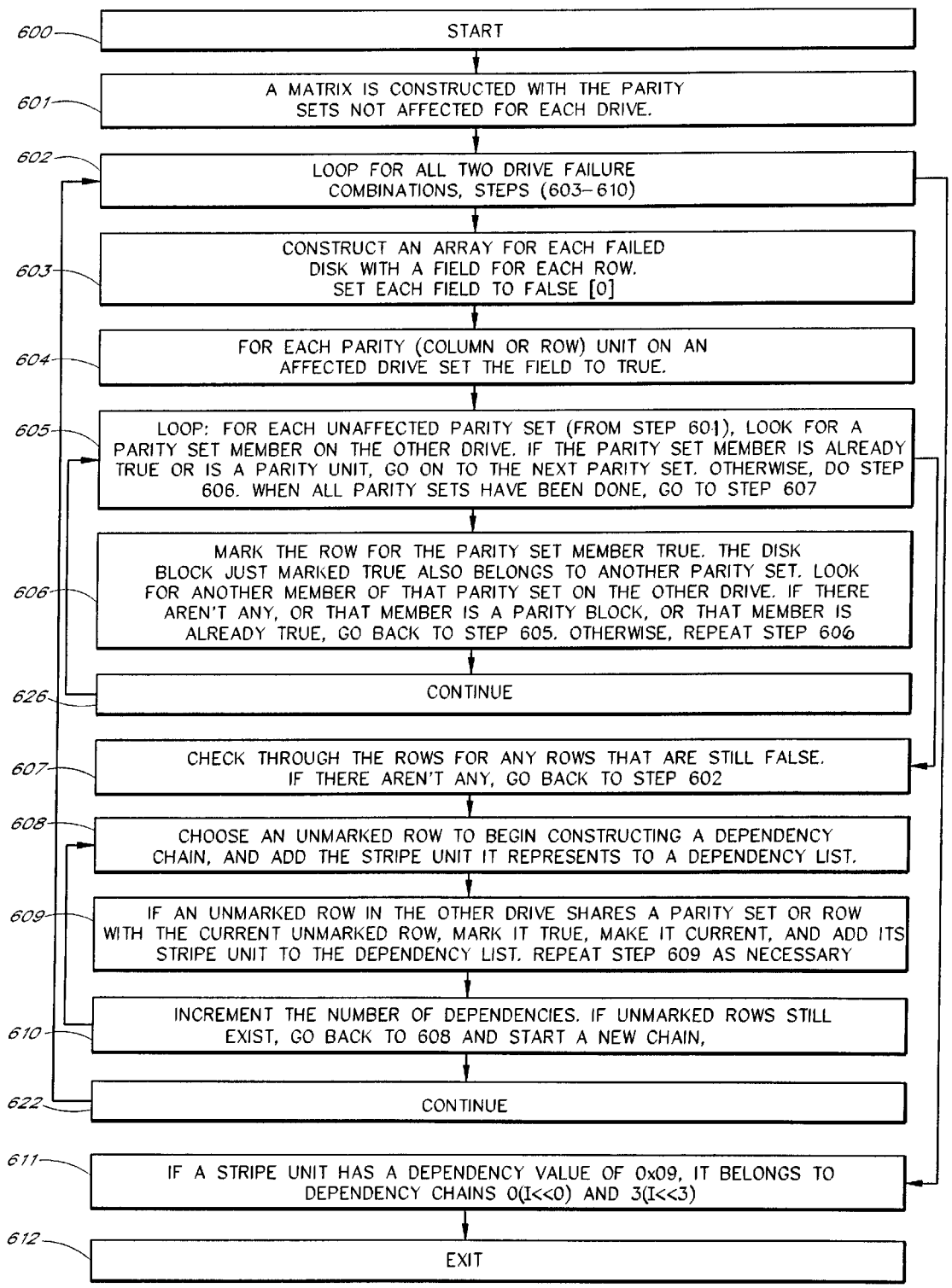
FIG. 6 is a flowchart showing the processes steps of analyzing a parity set to find dependencies.

FIG. 6 is a flowchart showing the steps of analyzing the arrangement. After finding a parity arrangement that does not violate the first three criteria the parity arrangement is analyzed for unresolvable (circular) two-disk failure dependencies. The flowchart in FIG. 6 begins at a process block 601 where a matrix is constructed with the parity sets not affected for each drive (every drive will have two parity sets, either column or row, that do not appear on the drive). The process then advances to a loop block 602. The loop block 602 provides two nested loops to iterate through each two-drive failure combination. A loop counter fail_1 iterates from 0 to N−2, and a loop counter fail_2 iterates from fail_1+1 to N−1. The first process block inside the loop is a process block 603 where an array is constructed for each failed disk, with a field for each row. Each field is initially set to 0 (false) to indicate that a stripe unit can be reconstructed.

The process then advances to a process block 604 where, for each parity (column or row) unit on an affected drive, the row is set to 1 (true). The process then advances to a process block 605, where for each unaffected parity set (from the process block 601), the process looks for a parity set member on the other drive. If the parity set member is already true, or is a parity unit, then the next parity set is checked; otherwise, the process advances to a process block 606. When all parity sets have been checked, the process advances to a process block 607.

In the process block 606, the row for the parity set member is marked (set) to true. The disk block just marked true also belongs to another parity set. The process block then looks for another member of that parity set on the other drive (this is following a resolvable dependency). If there are none, or that member is a parity block, or that member is already true, then the process jumps back to the process block 605; otherwise the process repeats the process block 606.

By the time the process reaches the process block 607, the process has identified all is the blocks that can be reconstructed from the particular two-drive failure indicated by fail_1 and fail_2. The process must now search for blocks that cannot be reconstructed. The process first checks through the rows for any rows that are still false. If there rows that are false, the process advances to a process block 608; otherwise, the process jumps back to the process block 602.

If the process reaches process block 608, it means that there is a block that cannot be reconstructed (process block 606 already provided the blocks that can be reconstructed). Thus, the dependency chains identify members of circular dependencies, which are used to shorten the searching process. To find dependencies, the process chooses an unmarked (still false) row to begin constructing a dependency chain. The stripe unit represented by the chosen row is added to a dependency list. The process then advances to a process block 609.

In the process block 609, if an unmarked row in the other failed drive shares a parity set or row with the current unmarked row, the process marks the row true, makes it current, and adds its stripe unit to the dependency list. The process loops in the process block 609 through all unmarked rows and then advances to a process block 610.

In the process block 610, the process increments the number of circular or unresolvable dependencies. If unmarked rows still exist, the process jumps back to the process block 608 and starts a new chain; otherwise, the process jumps back to the process block 602.

A process block 622 is the end block for the nested loops started in the process block 602. When the nested loops are complete, the process advances to a process block 611. When the process reaches the process block 611, all two-drive failure combinations have been evaluated and the process has a list of blocks in a dependency for this arrangement. In one embodiment, the blocks are stored as a binary tag for each stripe unit. If a stripe unit has a dependency value of 09 (hexadecimal), it belongs to dependency chains 0 (1<<0) and 3 (1<<3). A stripe unit with a tag of 0 has no unresolved dependencies. If this parity arrangement has fewer dependencies (or in a zero-dependency case, the same number) than any previous arrangement, the parity arrangement and the dependencies are saved to disk. Upon completion of the process block 611, the process advances to an exit block 612, and exits.

The process block 612 returns a new current block for the main iteration routine (all following stripe units are then cleared). Since the process searches for an arrangement with no dependencies, the process will look at the highest block number in each dependency, and select the lowest of these highest blocks to return. Changing a later block in the arrangement would not have the possibility of removing the dependency. For the example six drive parity arrangement (D3/E3 dependency) described in connection with Table 3, the analysis routine would return 17, the logical stripe unit number of E3. Block numbers with zero circular dependencies return the largest logical stripe unit number in the arrangement, plus one.

Minimizing reconstruction

The process block 606 of the above algorithm is more than a method of identifying stripe units that may be reconstructed. The process block 606 also identifies the steps required to actually recreate the stripe units. For any given number of drives, it is desired to select an arrangement that reduces the number of reconstruction involved in a drive failure. The process block 606 maintains a counter to count the number of reconstruction steps involved. Each iteration in the process block 606 represents a reconstruction of a stripe unit and a reconstruction that must occur to reconstruct another stripe unit. For each two-drive failure, the number of reconstructions necessary is described by the following algorithm:

hop=(number of iterations reconstruction hops in the process block 606)
   total=(running count of reconstructions necessary for parity arrangement)
   (after every step 6)
   while (hop)
     total+=hop--,
   end while By counting the number of reconstructions, it is possible to identify the best zero-dependency schemes.

Arrangements

The procedures listed above in connection with FIGS. 4, 5, and 6 identify many schemes with no circular or unresolved dependencies. In many cases, there are multiple solutions. For example, for a six drive array, there are 29,568 distinct schemes that meet the desired criteria. A four-drive array is listed in Table 1 above.

There are sixteen distinct four-drive schemes with the same parity unit placement and the same number of reconstructions. The average number of reconstructions per failed stripe unit in a two-drive failure is 4/3, and the average number of reconstructions per stripe-unit in a two-drive failure is 2/3.

There are two alternate four-drive parity schemes, shown in Tables 6 and 7, that evenly distribute column parity. Both of these schemes have 2/3 reconstructions per stripe unit in a two-drive failure, and 4/3 reconstructions per failed stripe unit in a two-drive failure. The four-drive schemes offer no capacity savings over a RAID 1 scheme, and are more complex. However, the four-drive schemes will provide full recovery after the loss of any two drives, which RAID 1 cannot. The four drive array has 8 logical blocks. Table 8 shows how physical to logical addresses are mapped (i.e., how the array is stripped) in the four drive arrangements.

TABLE 6

| A1 | A2 | (1) | (A) |
|----|----|-----|-----|
| (2) | (B) | B2 | B1 |
| C4 | C3 | (C) | (3) |
| (D) | (4) | D3 | D4 |

TABLE 7

| A4 | A1 | (1) | (A) |
|----|----|-----|-----|
| (2) | (B) | B3 | B2 |
| C3 | C2 | (C) | (3) |
| (D) | (4) | D4 | D1 |

TABLE 8

| 0 | 1 | P | P |
|---|---|---|---|
| P | P | 2 | 3 |
| 4 | 5 | P | P |
| P | P | 6 | 7 |

A five-drive (five-by-five) parity arrangement is shown in Table 9. This arrangement has 2/3 reconstructions per stripe unit in a two-drive failure, and 5/3 reconstructions per failed stripe unit in a two-drive failure. The five-drive parity arrangement is striped as shown in Table 10.

TABLE 9

| A2 | A1 | A5 | (1) | (A) |
|----|----|----|-----|-----|
| B1 | (2) | (B) | B3 | B2 |
| (C) | C4 | C3 | C2 | (3) |
| D4 | D3 | (4) | (D) | D5 |
| (5) | (E) | E1 | E5 | E4 |

TABLE 10

| 0 | 1 | 2 | P | P |
|---|---|---|---|---|
| 5 | P | P | 3 | 4 |

TABLE 10-continued

| P | 6 | 7 | 8 | P |
|---|---|---|---|---|
| 10 | 11 | P | P | 9 |
| P | P | 12 | 13 | 14 |

A six-drive (six-by-six) XOR parity arrangement is shown in Table 11. Data blocks are striped as shown in Table 12. This parity arrangement has 0.683 reconstructions per stripe unit in a two-drive failure, and 2.05 reconstructions per failed stripe unit in a two-drive failure. The parity algorithm found 246 schemes with the same reconstruction demands. There are no zero dependency schemes that stripe the column parity sets across all columns. However, a global striping effect can be instituted by reordering columns on the disk. For example, every other six-by-six block could have the alternate parity arrangement shown in Table 13 to complement the arrangement shown in Table 11.

TABLE 11

| A1 | A2 | A3 | A4 | (1) | (A) |
|----|----|----|----|-----|-----|
| B4 | B5 | (2) | (B) | B2 | B6 |
| (3) | (C) | C6 | C1 | C5 | C3 |
| D2 | D6 | D4 | D5 | (4) | (D) |
| E5 | E3 | (5) | (E) | E6 | E1 |
| (6) | (F) | F1 | F2 | F3 | F4 |

TABLE 12

| 0 | 1 | 2 | 3 | P | P |
|---|---|---|---|---|---|
| 6 | 7 | P | P | 4 | 5 |
| P | P | 8 | 9 | 10 | 11 |
| 12 | 13 | 14 | 15 | P | P |
| 18 | 19 | P | P | 16 | 17 |
| P | P | 20 | 21 | 22 | 23 |

TABLE 13

| A2 | A1 | A4 | A3 | (A) | (1) |
|----|----|----|----|-----|-----|
| B5 | B4 | (B) | (2) | B6 | B2 |
| (C) | (3) | C1 | C6 | C3 | C5 |
| D6 | D2 | D5 | D4 | (D) | (4) |
| E3 | E5 | (E) | (5) | E1 | E6 |
| (F) | (6) | F2 | F1 | F4 | F3 |

A seven drive (seven-by-seven) XOR parity arrangement is shown in Table 14. The seven drive array is striped as shown in Table 15. This arrangement evenly stripes the parity across all columns. It requires 2/3 reconstructions per stripe unit in a two-drive failure, and 7/3 reconstructions per failed stripe unit in a two-drive failure.

TABLE 14

| A3 | A2 | A1 | A7 | A6 | (1) | (A) |
|----|----|----|----|----|-----|-----|
| B2 | B1 | B7 | (2) | (B) | B4 | B3 |
| C1 | (3) | (C) | C5 | C4 | C3 | C2 |
| (D) | D6 | D5 | D4 | D3 | D2 | (4) |
| E6 | E5 | E4 | E3 | (5) | (E) | E7 |
| F5 | F4 | (6) | (F) | F1 | F7 | F6 |
| (7) | (G) | G2 | G1 | G7 | G6 | G5 |

TABLE 15

| 0 | 1 | 2 | 3 | 4 | P | P |
|---|---|---|---|---|---|---|
| 7 | 8 | 9 | P | P | 5 | 6 |

TABLE 15-continued

| 14 | P | P | 10 | 11 | 12 | 13 |
|----|---|---|----|----|----|----|
| P | 15 | 16 | 17 | 18 | 19 | P |
| 21 | 22 | 23 | 24 | P | P | 20 |
| 28 | 29 | P | P | 25 | 26 | 27 |
| P | P | 30 | 31 | 32 | 33 | 34 |

An eight drive (eight-by-eight) parity arrangement is shown in Table 16. This arrangement averages 0.70 reconstructions per stripe unit in a two-drive failure, and 2.81 reconstructions per failed stripe unit in a two-drive failure. A slightly less efficient arrangement that evenly distributes column parity is shown in Table 17. This parity arrangement uses 0.72 reconstructions per stripe unit in a two-drive failure, and 2.87 reconstructions per failed stripe unit in a two-drive failure. An eight drive system is striped as shown in Table 18.

TABLE 16

| A2 | A3 | A4 | A5 | A7 | A6 | (1) | (A) |
|----|----|----|----|----|----|-----|-----|
| B6 | B5 | B8 | B7 | (2) | (B) | B3 | B4 |
| C5 | C2 | (3) | (C) | C4 | C8 | C7 | C1 |
| (4) | (D) | D1 | D8 | D3 | D2 | D6 | D7 |
| E1 | E6 | E2 | E4 | E8 | E7 | (5) | (E) |
| F7 | F1 | F5 | F3 | (6) | (F) | F2 | F8 |
| G3 | G4 | (7) | (G) | G1 | G5 | G8 | G6 |
| (8) | (H) | H6 | H1 | H5 | H3 | H4 | H2 |

TABLE 17

| A1 | A2 | A4 | A3 | A6 | A8 | (1) | (A) |
|----|----|----|----|----|----|-----|-----|
| B2 | B3 | B1 | B4 | (2) | (B) | B8 | B7 |
| C5 | C1 | (3) | (C) | C4 | C3 | C6 | C8 |
| (4) | (D) | D7 | D2 | D1 | D4 | D5 | D6 |
| E8 | E7 | E6 | E5 | E3 | E2 | (E) | (5) |
| F7 | F5 | F8 | F6 | (F) | (6) | F4 | F3 |
| G6 | G4 | (G) | (7) | G7 | G5 | G2 | G1 |
| (H) | (8) | H5 | H1 | H8 | H7 | H3 | H2 |

TABLE 18

| 0 | 1 | 2 | 3 | 4 | 5 | P | P |
|---|---|---|---|---|---|---|---|
| 8 | 9 | 10 | 11 | P | P | 6 | 7 |
| 16 | 17 | P | P | 12 | 13 | 14 | 15 |
| P | P | 18 | 19 | 20 | 21 | 22 | 23 |
| 24 | 25 | 26 | 27 | 28 | 29 | P | P |
| 32 | 33 | 34 | 35 | P | P | 30 | 31 |
| 40 | 41 | P | P | 36 | 37 | 38 | 39 |
| P | P | 42 | 43 | 44 | 45 | 46 | 47 |

Array Controller Programs

In one embodiment, the two-dimensional XOR parity arrangements are implemented in array processor 208. Operation of the array processor 208 is described in terms of "programs" written using a disk command programming language described below. The actual operations performed by the controller 208 are implemented in hardware, software, or both. The example programs below are directed towards a six disk array using the parity arrangement shown in Table 19 and the data striping (physical to logical address mapping) shown in Table 20.

TABLE 19

| A2 | A3 | A4 | A5 | (1) | (A) |
|----|----|----|----|-----|-----|
| B5 | B6 | (2) | (B) | B3 | B4 |

TABLE 19-continued

| (3) | (C) | C1 | C2 | C6 | C5 |
|-----|-----|----|----|----|----|
| D1  | D2  | D6 | D3 | (4)| (D)|
| E4  | E1  | (5)| (E)| E2 | E6 |
| (6) | (F) | F3 | F4 | F5 | F1 |

TABLE 20

| 0  | 1  | 2  | 3  | P  | P  |
|----|----|----|----|----|----|
| 6  | 7  | P  | P  | 4  | 5  |
| P  | P  | 8  | 9  | 10 | 11 |
| 12 | 13 | 14 | 15 | P  | P  |
| 18 | 19 | P  | P  | 16 | 17 |
| P  | P  | 20 | 21 | 22 | 23 |

In one embodiment, the two-set XOR parity arrangement is implemented in a disk array comprising a software disk-driver and six Seagate™ Barracuda™ Fibrechannel™ drives. In addition to the normal read/write primitives, the Fibrechannel™ drives support a class of special XOR commands, which perform XOR calculations in the disk electronics, maintain a separate XOR result buffer, and can interact directly with other drives. The special XOR commands help facilitate RAID 5 operations. In the present application, the special XOR is commands are used to provide two-drive fault tolerance. Conventional disk drives provide the following primitive operations:

Read: Read block(s) from disk storage into host memory.
Write: Write block(s) from host memory into disk storage.

The special XOR commands provide the following additional primitive operations:

XDWrite: Write block(s) from host memory into disk storage. The disk performs an XOR between the old and new contents of disk storage before committing the write. The results of the XOR are retained in an XOR buffer, and are obtained by using an XDRead command. This command may be issued nondestructively, with the XOR being performed but the new blocks not being written to disk.

XDRead: Reads the contents of a disk's XOR buffer into host memory.

XPWrite: Write block(s) from host memory into a disk's buffer. The disk performs an XOR between the old contents of disk storage and the buffer, and commits the results of the XOR to disk storage.

XDWriteExtended: Write block(s) from host memory to disk storage. The disk performs an XOR between the old and new contents of disk storage before committing the write. The disk also initiates an XPWrite command to another disk.

Regenerate: The host sends the disk a list of blocks on one or more other disks to be used in conjunction with block(s) on the target disk. The target disk initiates reads to the other disks, and performs an XOR operation between the blocks on all disks in the list, including itself. All transfers have the same number of blocks. The results of the XOR operations are retained in the XOR buffer to be obtained using an XDRead command. This command may also be issued with blocks from the host to be used in an additional XOR operation.

Rebuild: The host sends the disk a list of blocks on one or more other disks to be written to a location on the target disk. The target disk initiates reads to the other disks, performs an XOR operation between all the blocks, and commits the results to disk storage. All transfers must have the same number of blocks. This command may also be issued with blocks from the host to be used in an additional XOR operation.

Disk control program for the two-drive XOR parity arrangement are provided below in three forms: (A) without any XOR on the drives; (B) with XOR on the drives but without third party commands (e.g., XDWrite Extended, Regenerate, Rebuild); and, finally, (C) with XOR and third party commands.

The programs below are described using the following syntax:

Code(Drive, Stripe Units, [Drive, Stripe Unit])

Where Code is a command code listed in Table 20. The parentheses represent a host command, and the square brackets (if present) represent a secondary command associated with the XDWriteExtended, Rebuild, or Regenerate commands. Host buffers are represented as double lower case letters (e.g., aa, bb, cc, etc), and the buffer in a disk drive is indicated by #drive# where drive is an integer. Host XOR commands have only buffers in their list. Comments are indicated by a double slash "//". The symbols "→" and "←" denote data transfer. Multiple operations may be coded using one command code. For example, the commands to write A1 and A2 to drive 1 and write A3 to drive 2 can be coded as WR(1, A1, A2)WR(2, A3) or WR(1,A1, A2)(2,A3).

New data in a data stripe unit is indicated by an uppercase initial letter, while old data is indicated with a lowercase initial letter. Parity units are in bold, and preceded with a P or p. For the purposes of the present description, and for convenience, operations are described in terms of whole stripe units. However, operations on less than whole stripe units are within the scope of the present disclosure.

TABLE 20

| Command Codes |
|---|
| RD - Read |
| WR - Write |
| XW - XDWrite, destructive |
| Xw - XDWrite, non-destructive |
| XR - XDRead |
| XP - XPWrite |
| XX - XDWriteExtended |
| Xx - XDWriteExtended, non-destructive |
| RB - Rebuild |
| RG - Regenerate |
| XOR - Host XOR |

The ordering of commands is shown for convenience. In actual operation, commands may be reordered to take advantage of asynchronous disk access, but operations involving the same disk will typically be in the order listed.

The parity arrangement for the following examples is given in Table 21:

TABLE 21

| Drive | | | | | |
|---|---|---|---|---|---|
| 1 | 2 | 3 | 4 | 5 | 6 |
| A2 | A3 | A4 | A5 | P1 | PA |
| B5 | B6 | P2 | PB | B3 | B4 |
| P3 | PC | C1 | C2 | C6 | C5 |
| D1 | D2 | D6 | D3 | P4 | PD |
| EA | E1 | P5 | PE | E2 | E6 |
| P6 | PF | F3 | F4 | F5 | F1 |

The examples are arranged according to the following outline:

A. Sample Code for Non-XOR implementation:
  1. Non-degraded mode (no drive failures)
  2. Degraded mode (single drive failure)

3. Double degraded mode, two-drive failure
4. Rebuilding mode
B. Sample Code for XOR implementation
 1. Non-degraded mode (no drive failures)
 2. Degraded mode (single drive failure)
 3. Double degraded mode
 4. Rebuilding mode
C. Sample Code for XOR implementation with special XOR commands
 1. Non-degraded mode (no drive failures)
 2. Degraded mode (single drive failure)
 3. Double degraded mode
 4. Rebuilding mode A. Sample Code for Non-XOR implementation
 1. Non-degraded mode (no drive failures)
 Read data. The array is fully striped, as in RAID 5.
  RD(1,a2) \\Reads one stripe unit
  RD(1,b5)RD(2,b6) \\Reads two stripe units Perform a Very Large Write (includes complete parity arrangement) using the following steps: (1) Write out all data; (2) Perform XOR on all rows to calculate parity A–F; (3) write to disk; (4) Perform XOR on all column sets 1–6; and (5) write to disk.

PA←XOR(A2, A3, A4, A5)
 PB←XOR(B3, B4, B5, B6)
 PC←XOR(C1, C2, C6, C5)
 PD←XOR(D1, D2, D6, D3)
 PE←XOR(E2, E6, E4, E1)
 PF←XOR(F3, F4, F5, F1)
 P1←XOR(C1, D1, E1, F1)
 P2←XOR(A2, C2, D2, E2)
 P3←XOR(A3, B3, D3, F3)
 P4←XOR(A4, B4, E4, F4)
 P5←XOR(A5, B5, C5, F5)
 P6←XOR(B6, C6, D6, E6)
 WR(1, A2, B5, P3, D1, E4, P6)
 WR(2, A3, B6, PC, D2,E1, PF)
 WR(3, A4, P2,C1, D6, P5, F3)
 WR(4, A5, PB,C2, D3, PE, F4)
 WR(5, P1, B3, C6, P4, E2, F5)
 WR(6, PA, B4,C5, PD, E6, F1)

Perform a Stripe Write (includes complete row) using the following steps: (1) Read all data stripe units from row; (2) Perform XOR on all new data in row; (3) write to row parity; (4) Write out new data stripe units; (5) Read in column parities; (6) perform update XOR; and (7) rewrite column parity.

// Example—write A2–A5.
 RD(1,a2) (2,a3) (3,a4) (4,a5)
 RD(1, p3) (3, p2, p5) (5, p4)
 PA←XOR(A2, A3, A4, A5)
 WR (1, A2) (2, A3) (3, A4) (4, A5)(6, PA)
 P2←XOR(a2, A2, p2)
 P3←XOR(a3, A3, p3)
 P4←XOR(a4, A4, p4)
 P5←XOR(a5, A5, p5)
 WR (1, P3) (3, P2, P5) (5, P4)

Perform a Partial Stripe Write (not a complete row) using the following, steps: (1) Read all stripe units to be overwritten; (2) Read stripe parity and all column parities; (3) Write out new stripe units; (4) XOR with old/new data and parities to calculate update XOR; and (5) rewrite all parities.

// Example: write A2–A4 (3/4 of a stripe)
 RD( 1, a2) (2, a3) (3, a4) (6, pA) RD( 1, p3) (3, p2) (5, p4)
 aa←XOR(A2, a2)
 bb←XOR(A3, a3)
 cc←XOR(A4, a4)
 PA←XOR (aa, bb, cc, pA)
 WR(1, A2) (2, A3) (3, A4) ( 6, PA)
 P2←XOR(aa, p2)
 P3←XOR(bb, p3)
 P4←XOR (cc, p4)
 WR(1, P3) (3, P2 ) (5, P4)

Perform an Update write (small writes) using the following steps: (1) Read stripe unit to be written; (2) read old row and column parities; (3) Write out new stripe unit; (4) XOR with old/new data and parities to calculate update XOR; and (5) rewrite parities.

//Example: write A2
 RD(1, a2) (3, p2) (6, pA)
 aa←XOR (A2,a2)
 PA←XOR (aa, pA)
 P2←XOR(aa, p2)
 WR(1, A2) (3, P2) (6, PA)

2. Degraded mode (single drive failure)
Perform a Read from failed drive using the following steps: (1) Read all other members of the row parity set (including the row parity); and (2) Use XOR to regenerate the missing stripe unit. The column parity set could be used, but the row stripe is more likely to take advantage of caching or of reads larger than the failed stripe unit.

// Example: Drive 1 failed, read A2
 RD( 2, a3) (3, a4) (4, a5) (6, pA)
 a2←XOR (a3, a4, a5, pA)

Perform a Write to failed drive using the following steps: (1) Regenerate striped unit as above; and (2) follow update write procedures.

// Example: Drive 1 failed, write A2
 RD( 2, a3) (3, a4, p2) (4, a5) (6, pA)
 a2←XOR(a3, a4, a5, pA)
 aa←XOR(a2, A2)
 PA<XOR(aa, pA)
 P2←XOR(aa, p2)
 WR(3, P2) (6, PA)

To perform a Write to drive with failed parity unit, perform a write as normal but ignore the failed parity unit.

// Example: Drive 6 failed, write A2
 RD(1, a2) (3, p2)
 P2←XOR(a2, A2, p2)
 WR(1, A2) (3, P2)

3. Double degraded mode, two-drive failure
Perform a Write to failed drive with failed parity drive using the following steps: (1) Read the remaining parity set; (2) Recalculate the parity set from available stripe units; and (3) Write out the parity unit ignoring the failed parity drive.

// Example: Drives 1 and 6 failed, write to A2
 RD (2, d2) (4, c2) (5, e2)
 P2←XOR(A2, d2, c2, e2)
 WR(3, P2)

To Write to an intact drive with both parity drives gone, perform a normal write.

// Example: Drives 3 and 6 failed, write A2

WR(1, A2)
To Read from a failed drive with one parity drive down, reconstruct any stripe units needed for remaining parity set.
   // Example one: Drives 1 & 6 failed, read A2
   // In this example, all other stripe units in the parity set are available
   RD (2, d2) (3, p2) (4, c2),(5, e2)
   A2←XOR(d2, c2, e2, p2)
   // Example two: Drives 1 and 3 failed, read A2
   // In this example the 'A' set must be used to reconstruct.
   // However, A4 is not available (it is on drive 3).
   // A4 must be reconstructed from the '4' set, which requires E4 (it is on drive 1)
   // E4 must be reconstructed from the E set, which is otherwise intact
   RD (2, e 1) (4, pE) (5, e2) (6, e6)
   e4←XOR(e1, e2, e6, pE)
   RD(4, f4) (5, p4) (6, b4)
   a4←XOR(f4, b4, e4, p4)
   RD (2, a3) (4, a5) (6, pA)
   a2←XOR (a3, a4, a5, pA)
To Read from failed drive with other failed drive having a member of one parity set, use the other set to regenerate.
   // Example: Drives 1 & 5 failed, read A2
   // Drive 5 has set 2 member E2, but no members of A
   RD( 2, a3) (3, a4) (4, a5) (6, pA)
   a2←XOR(a3, a4, a5, pA)
To Read from failed drive with other failed drive having a member of both its parity sets, regenerate a missing parity set member to regenerate read.
   // Example: Drives 1 & 2 failed, read A2
   // Drive 2 has 'A' member A3, and '2' member D2.
   // The 3 set cannot be regenerated ('3' parity unit is on drive 1),
   // so D2 must be regenerated.
   // The D row is also missing D1, so D1 must be regenerated from parity set 1.
   // E1 is on drive 2, it must be regenerated from parity set E.
   // E4 is on drive 1, it must be regenerated from parity set 4, which is intact.
   RD (3, a4) (4, f4) (5, p4) (6, b4)
   e4←XOR(a4, b4, f4, p4)
   RD (4, pE)(5, e2)(6, e6)
   e1←XOR (e2, e4, e6, pE)
   RD(3, c1) (5, p1) (6, f1)
   d1←XOR(c1, e 1, f 1, p1)
   RD(3, d6)(4, d3)(6, pD)
   d2←XOR(d 1, d3, d6, pD)
   RD (3, p2) (4, c2) (5, e2)
   a2←XOR(c2, d2, e2, p2)
The depth of the multiple levels of regeneration (resolvable dependencies) depends, to some extent, on the arrangement. Table 22 shows the regeneration requirements of a two-drive failure, with the first failed drive being number 1, the second drive listed in the horizontal axis, and the number of regenerations required in the vertical axis. The number of data stripe units in the array is 24.

TABLE 22

|   | 2 | 3 | 4 | 5 | 6 |
|---|---|---|---|---|---|
| 0 | 16 | 16 | 16 | 16 | 16 |
| 1 | 2 | 4 | 3 | 4 | 3 |
| 2 | 2 | 2 | 3 | 2 | 2 |
| 3 | 1 | 2 | 1 | 2 | 1 |
| 4 | 1 | 0 | 1 | 0 | 1 |
| 5 | 1 | 0 | 0 | 0 | 1 |
| 6 | 1 | 0 | 0 | 0 | 0 |

The worst case would be repeated requests for A3 with drives 1 and 2 out, but most accesses have much more modest reconstruction requirements. In a case where multiple regenerations are required, the implementation could read the entire extent, and then perform all necessary calculations without requiring repeated reads.

4. Rebuilding mode

In rebuilding mode, data is regenerated as if a drive has failed, and then written directly to the drive. Parity units on the rebuilding drive are generated by XOR of all its set members.

B. Sample Code for XOR implementation

This section illustrates how the XOR commands (excluding special XOR commands) can be used to expedite the XOR parity implementation.

1. Non-degraded mode (no drive failures)

To Read (any size), use non-XOR implementation above.

To perform a Very Large Write (including complete parity arrangement), use the non-XOR implementation above.

To perform a Full Stripe Write (a complete row) use the following steps: (1) Use the data to calculate the new parity row; (2) Use XDWrite commands to write the data to disk; (3) use XDReads to get the XOR data from the XOR buffers; (4) Write out the parity unit for the row; and (5) use XPWrites to update the parity units for the column parities.
   // Example: Write A2–A5 (full stripe)
   XW(1, A2) (2, A3) (3, A4) (4, A5)
   PA←XOR(A2, A3, A4, A5)
   aa←XR(#1#)
   bb←XR(#2#)
   cc←XR(#3#)
   dd←XR(#4#)
   WR(6, A5)
   aa→XP(3, P2)
   bb→XP(1, P3)
   cc→XP(5, P4)
   dd→XP(3, P5)
To perform a Partial Stripe Write (not a complete row) use the following steps: (1) Use XDWrites to write the new data to the disks; (2) use XDReads to get the contents of the XOR buffer; (3) use XPWrite to the appropriate column parities; (4) XOR all of the XOR buffers to get a buffer for the row parity; and (5) XPWrite that buffer to the row parity.
   // Example: write A2–A4 (3/4 of a stripe)
   XW( 1,A2)(2,A3)(3,A4)
   aa←XR(#1#)
   bb←XR(#2#)
   cc←XR(#3#)
   dd←XOR (aa, bb, cc)
   ←aa→XP (3, P2)
   bb→XP( 1, P3)

cc→XP(5, P4)

dd→XP(6, PA)

To perform an Update Write (small writes) use the following steps: (1) Use XDWrite to write the new data to the block; (2) Use XDRead to get the results of the XOR buffer; and (3) Use XPWrite to write the update information to both parities.

// Example: write A2

XW(1, A2)

aa←XR(#1#)

aa→XP(3, P2)

aa→XP(6, PA)

2. Degraded mode (single drive failure)

To Read from a failed drive, use the non-XOR procedure above.

To Write to failed drive, Regenerate stripe unit, then follow update write procedures.

// Example: Drive 1 failed, write A2

RD (2, a3) (3, a4) (4, a5) (6, pA)

a2←XOR(a3, a4, a5, pA)

aa←XOR(a2, A2)

aa→XP(3, P2) (6, PA)

To Write to drive with failed parity unit, ignore the failed parity unit.

// Example: Drive 6 failed, write A2

XW (1, A2)

aa←XR(#1#)

aa→XP(3, P2)

3. Double degraded mode

Without third party commands, these procedures will all be performed in much the same way as the non-XOR procedure above.

4. Rebuilding mode

To rebuild, use the non-XOR procedures above.

C. Sample Code for XOR with third party commands

1. Non-degraded mode (no drive failures)

To Read (any size) use the same procedure as the non-XOR commands above.

To perform a Very Large Write (including complete parity arrangement) use the non-XOR commands above.

To perform a Stripe Write (including a complete row) use the following steps: (1) Perform an XOR on all new data blocks in row; (2) Write to stripe parity; and (3) Write out new blocks using XDWriteExtended to update column parity.

// Example—write A2–A5.

PA←XOR(A2,A3,A4,A5)

XX(1,A2,[3, P2]) (2,A3,[1, P3]) (3, A4, [5, P4]) (4, A5, [3, P5])

WR(6, PA)

To perform a Partial Stripe Write (not a complete row) use the following steps: (1) Read all row stripe units not overwritten; (2) Calculate row parity with old and new stripe units; (3) Write to row parity; and (4) Write out new stripe units using XDWriteExtended to update column parity.

// Example: write A2–A4 (3/4 of a stripe)

RD(4, a5)

PA←XOR(A2, A3, A4, a5)

XX(1, A2, [3, P2])(2, A3, [1, P3]) (3, A4, [5, P4])

WR(6, PA)

To Update write (small writes) use the XOR procedure above.

2. Degraded mode (single drive failure)

To Read from a failed drive, send regenerate command to parity drive for the desired stripe.

// Example: Drive 1 failed, read A2

RG(6, pA, [2, a3], [3, a4], [4, a5])

a2←XR(#6#)

To Write to a failed drive, regenerate block as above, then follow update write procedures.

// Example: Drive 1 failed, write A2

RG(6, pA, [2, a3], [3, a4], [4, a5])

a2←XR(#6#)

aa←XOR(a2, A2)

aa→XP (3, P2) (6, PA)

To Write to a failed parity drive, ignore the failed parity unit.

// Example: Drive 6 failed, write to A2

XX (1, A2, [3, P2])

3. Double degraded mode

To Write to failed drive with failed parity drive, if the remaining parity set has no members on the failed parity drive, use rebuild procedure above; otherwise, regenerate enough old data to perform an update operation on remaining parity drive.

// Example one: Drives 1 and 6 failed, write to A2

A2→RB (3, P2, [2, d2], [4, c2], [5, e2]

// Example two: Drives 1 & 3 failed, write A2

// Regenerate E4

RG(4, pE, [2, e1], [5, e2], [6, e6])

e4←XR(#4#)

// Regenerate A4 e4→RG (5, P4, [4, f4], [6, b4])

a4←XR(#5#)

// Update operation aa←XOR (A2, a4)

aa→RB (6, PA, [2, a3], [4, a5])

To Write to an intact drive with both parity drives gone, simply perform the write.

// Example: Drives 3 & 6 failed, write A2

WR(1, A2)

To Read from a failed drive with one parity drive failed, reconstruct any stripe units needed for the remaining parity set.

// Example one: Drives 1 & 6 failed, read A2

// In this example, all other stripe units in the parity set are available

RG (3, p2, [2, d2], [4, c2], [5, e2])

A2←XR(#3#)

// Example two: Drives 1 & 3 failed, read A2

// In this example the 'A' set must be used to reconstruct.

// However, A4 is not available (it's on drive 3).

// A4 must be reconstructed from the '4' set, which requires E4 (it's on drive 1)

// E4 must be reconstructed from the E set, which is otherwise intact

// Regenerate E4

RG (4, pE, [2, e 1], [5, e2], [6, e6])

e4←XR(#4#)

// Regenerate A4 e4→RG(5, p4, [4, f4], [6, b4])

a4←XR(#5#)

// Regenerate A2 a4→RG(6, pA, [2, a3], [4, a5])
a2←XR(#6#)
To Read from failed drive with other failed drive having a member of one parity set, use the other set to regenerate.
// Example: Drives 1 & 5 failed, read A2
// Drive 5 has set 2 member E2, but no members of A
RG(6, pA, [2, a3], [3, a4], [4, a5])
a2←XR(#6#)
To Read from failed drive with another failed drive having a member of both its parity sets, regenerate a missing parity set member to regenerate read.
// Example: Drives 1 & 2 failed, read A2
// Drive 2 has 'A' member A3, and '2' member D2
// The 3 set cannot be regenerated ('3' parity unit is on drive 1),
// so D2 must be regenerated
// The D row is also missing DI, so DI must be regenerated from parity set 1.
// E1 is on drive 2, it can be regenerated from parity set E.
// E4 is on drive 1, it can be regenerated from parity set 4, which is intact.
RG (5, p4, [3, a4], [4, f4], [6, b4])
e4←XR(#5#)
e4→RG(4, pE, [5, e2], [6, e6])
e1←XR(#4#)
e1→RG(5, p1, [3, c1], [6, c1])
d1←XR(#5#)
d1→RG (6, pD, [3, d6], [4, d3])
d2←XR(#6#)
d2→RG(3, p2, [4, c2], [5, e2])
a2←XR(#3#)

In some situations, it is more efficient (i.e., faster) to read the entire stripe map and manually reconstruct the data, at least for a stripe unit with so many dependencies.

4. Rebuilding mode

The rebuilding command can expedite rebuilding, especially when recovering from a single drive failure. The rebuild command is used to reconstruct a stripe unit and commit it to disk.
// Example: Rebuild A2 to disk.
RB ( 1, A2, [2, a3], [3, a4], [4, a5], [6, pA])

Although the foregoing invention has been described in some detail for purposes of clarity of understanding, it will be apparent that certain changes and modifications may be practiced by persons skilled in the art within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A redundant array of independent disk drives wherein a two-dimensional XOR parity arrangement provides two-drive fault tolerance, comprising:

a disk array comprising a first disk drive and a plurality of disk drives; and an array controller operatively coupled to the disk array, said array controller is configured to calculate row XOR parity sets and column XOR parity sets, said array controller is further configured to distribute said row XOR parity sets and said column XOR parity sets across said disk array by arranging said row and column XOR parity sets such that a first data block on said first disk drive exists in a first row parity set and a first column parity set, and wherein no other data block on any of said plurality of disk drives exists in both said first row parity set and said first column parity set.

2. The redundant array of independent disk drives of claim 1, wherein said first data block is a stripe unit.

3. The redundant array of independent disk drives of claim 1, wherein said array controller is configured to recover data lost due to a failure of any one disk drive in said disk array.

4. The redundant array of independent disk drives of claim 1, wherein said controller is configured to recover data lost due to a failure of any two disk drives in said disk array.

5. The redundant array of independent disk drives of claim 1, wherein said controller is further configured to reduce reconstruction interdependencies between said first disk block and a second disk block.

6. A method for providing two-drive fault tolerance in a redundant array of independent disk drives, comprising the steps of:

organizing a plurality of disk drives into a plurality of stripes, each of the plurality of stripes comprises a plurality of stripe units, wherein each stripe unit is located on a single disk drive; and arranging said stripe units into a plurality of XOR parity sets, each of said plurality XOR parity sets comprises a plurality of stripe units as members, said plurality of XOR parity sets comprises a plurality of row parity sets and a plurality of column parity sets such that each stripe unit exists in a parity set pair, said parity set pair comprising a row parity set and a column parity set, and wherein no two stripe units exist in the same parity set pair.

7. The method of claim 6, wherein each of said XOR parity sets comprises one or more data members and one or more parity members, said parity members calculated as an exclusive-or of said data members.

8. The method of claim 7, wherein each of said disk drives comprises data members and parity members.

9. The method of claim 6, wherein each of said parity members exists only one XOR parity set.

10. The method of claim 6, further comprising the step of analyzing said arrangement to detect cyclic dependencies.

11. A redundant array of independent disk drives configured to recover data lost due to a failure of any two disk drives in the array, comprising:

a disk array comprising a first disk drive and a plurality of disk drives; and an array controller operatively coupled to said disk array, said array controller configured to calculate row XOR parity sets and column XOR parity sets, said array controller is further configured to distribute said row XOR parity sets and column XOR parity sets across said disk array to reduce reconstruction interdependencies for data reconstructed from said row parity sets and said column parity sets, said interdependencies being reduced by arranging said row and column parity sets such that a first stripe on said first disk drive exists in a first row parity set and a first column parity set, and wherein no other stripe on any of said plurality of disk drives exists in both said first row parity set and said first column parity set.

* * * * *